US007080479B2

(12) United States Patent
Dallimore et al.

(10) Patent No.: US 7,080,479 B2
(45) Date of Patent: Jul. 25, 2006

(54) ADJUSTABLE DEVICE FOR PLANT GROWING CONTAINERS TO SUPPORT TOP DRESSINGS TO THE INSIDE EDGE OF THE DECORATIVE CONTAINER

(76) Inventors: Bonnie Dallimore, 1948 Creek Rd., Sandy, UT (US) 84093; Jimmy E. Holbrook, 73 Cooley St., Grantsville, UT (US) 84029

( * ) Notice: Subject to any disclaimer, the term of this patent is extended or adjusted under 35 U.S.C. 154(b) by 0 days.

(21) Appl. No.: 11/112,371

(22) Filed: Apr. 22, 2005

(65) Prior Publication Data

US 2005/0235557 A1 Oct. 27, 2005

Related U.S. Application Data

(60) Provisional application No. 60/564,481, filed on Apr. 22, 2004.

(51) Int. Cl.
*A01G 9/00* (2006.01)

(52) U.S. Cl. .......................................... 47/32; 47/41.11

(58) Field of Classification Search .................... 47/32, 47/31.1, 65.5, 66.6, 72, 41.11, 80, 79; 248/213.2; 220/495.08, 908.1; D11/164
See application file for complete search history.

(56) References Cited

U.S. PATENT DOCUMENTS 2,549,006 A * 4/1951 Propst ......................... 428/27
5,150,867 A 9/1992 Pesapane
5,279,069 A * 1/1994 Myer ............................ 47/32
5,430,971 A * 7/1995 Myer ............................ 47/32
D369,123 S * 4/1996 D'Alessandro ............ D11/148
6,048,592 A 4/2000 Rolf
6,170,144 B1 1/2001 Phillipson

OTHER PUBLICATIONS

Product brochure for "Big Brown Collar and Pot Steps" by Edgewater Products Co.
Product brochure for "Moss Cord" by Edgewater Products.

* cited by examiner

*Primary Examiner*—T. Nguyen
(74) *Attorney, Agent, or Firm*—Thorpe North & Western

(57) ABSTRACT

A device for covering the space between a top container rim of an inner plant growing container and the inside wall of an outer decorative container in which the inner plant growing container is placed, includes a plurality of arcuate pieces pivotally joined end to end, the device having opposite unconnected ends. The arcuate pieces are joined in a manner so that the device can be adjustably moved into ring configurations of different diameters to approximately fit within the inner wall of the decorative outer container and rest on the top rim of the inner growing container. Clips or tabs extend downwardly from the device to cooperate with the top rim of the inner container to hold the pieces from moving inwardly, thereby maintaining the adjusted diameter of the device and holding the device in position on top of the inner container. The device can be produced in a plurality of sizes, each size adjustable over a range of diameters.

13 Claims, 7 Drawing Sheets

Figure 1:
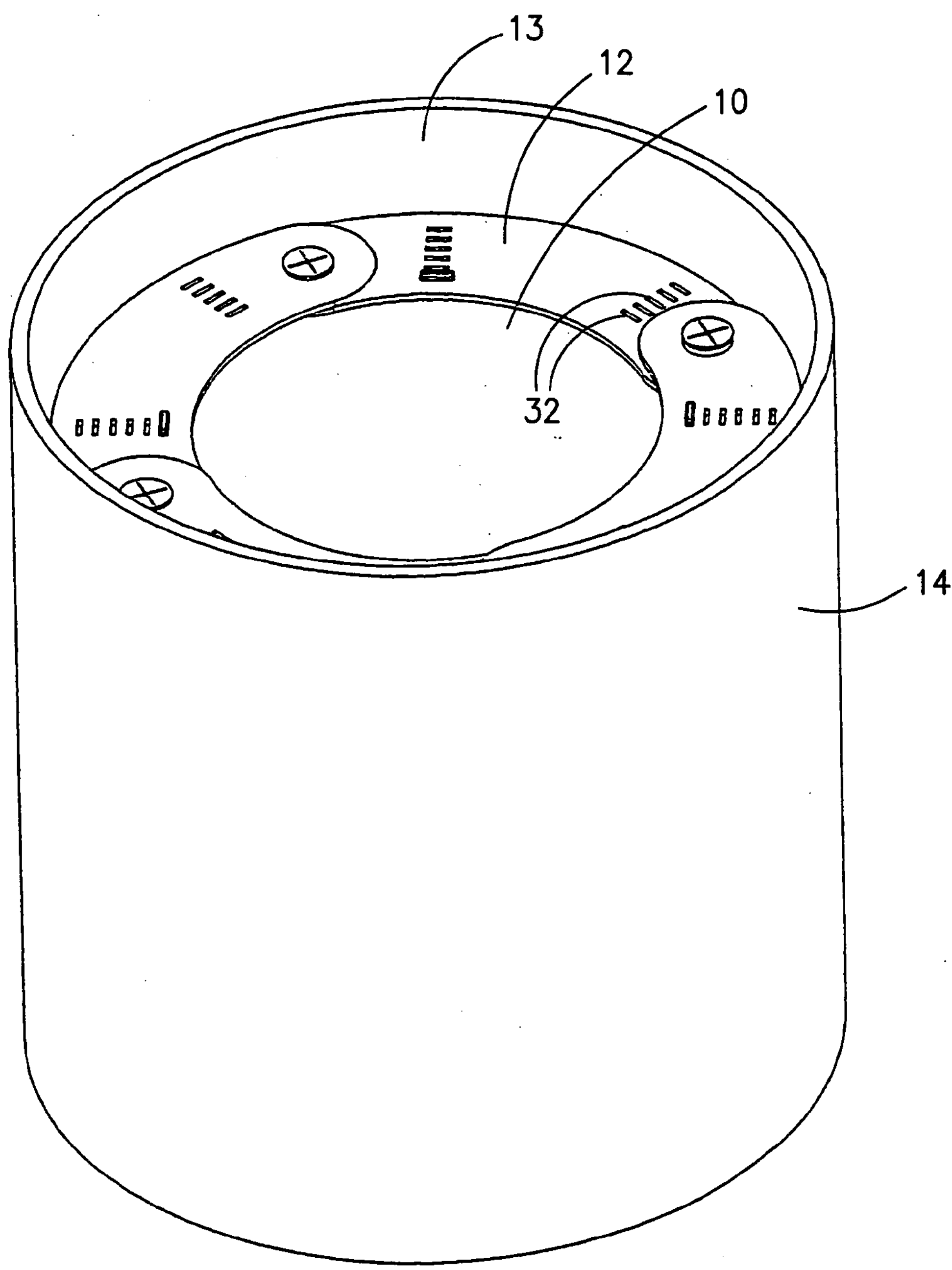

13
12
10
32
14

36
50
50
52
35
50
37
48
48
46
40
42
44
45
45

48
40
46
42
45
45
44

ADJUSTABLE DEVICE FOR PLANT GROWING CONTAINERS TO SUPPORT TOP DRESSINGS TO THE INSIDE EDGE OF THE DECORATIVE CONTAINER

RELATED APPLICATIONS

This application claims the benefit of Provisional Application No. 60/564,481, filed Apr. 22, 2004, entitled "Adjustable Device for Plant Containers to Support Top Dressings (Bark, Moss, Dirt, Etc.) to the Inside Edge of the Decorative Container."

BACKGROUND OF THE INVENTION

1. Field

The invention is in the field of decorative planters, particularly for indoor plants.

2. State of the Art

It is common for planters, particularly for indoor plants, to include a decorative container which receives a growing container therein with the plant in the growing container. The growing container is necessarily smaller in diameter than the decorative container so that it will fit into the decorative container. This means that there will be a space around the growing container containing the plant and the decorative container. It is then usually desirable to cover or fill in this space with decorative material such as bark, moss, rocks, dirt, or other decorative material. There is currently available from Edgewater Products Co. of Melrose Park, Ill., a synthetic moss material, described in U.S. Pat. No. 6,048,592, that can be placed over the open space in rope like fashion or in bundles that extend down into the space, in order to decoratively close the space between the containers. However, such material, if not spread and placed correctly, can fall down into the space. There is also a foam collar available from Edgewater Products Co. of Melrose Park, Ill., that is applied with adhesive around the inside top portion of the outer decorative container so that the inner container can be placed in the opening in the foam collar. The foam extends across the open space between the outer and inner containers forming a surface between the containers on which the decorative material can be placed or which itself is more decorative than the open space between the containers. However, the foam material being adhesively attached to the outer container makes it difficult to clean the outer container and foam collar, and if the collar is removed, a new collar has to be installed.

U.S. Pat. No. 5,150,867 shows a top dressing support member in the form of a ring made of a pliable, flexible and bendable material. The ring opens to be placed around a plant in an inner growing container and is then closed around the plant. Fingers around the central opening of the ring are bent downwardly and stuck into the soil in the growing container to support the ring. The outer portions of outwardly extending tabs are then bent upwardly as the ring is fit into the outer container to size the ring to the inside diameter of the outer container. When fit into the container, the ring provides support for top decorative dressing materials.

There remains, however, a need for an easily installed and, because the size of inner and outer containers vary so the space between the containers varies, easily size adjustable device to cover the space between the containers and provide a surface for supporting a decorative material.

SUMMARY OF THE INVENTION

According to the invention, a device for covering the space between a top container rim of an inner plant growing container and the inside wall of an outer decorative container in which the inner plant growing container is placed, comprises a plurality of arcuate pieces pivotally joined end to end, the device having opposite unconnected ends. The pieces of the device are joined in a manner so that the device can be adjustably moved into ring configurations of different diameters to approximately fit within the inner wall of the decorative outer container and rest on the top rim of the inner growing container. Clips or tabs secured to the device extend downwardly from the device to cooperate with the top rim of the inner container to hold the pieces from moving inwardly from the outer container wall, thereby maintaining the adjusted diameter of the device and holding the device in position covering the open space between the two containers. Since the adjustable diameters of the device using a particular size of arcuate pieces has a limited range of adjustment, the device can be produced in a plurality of sizes, each size of the device adjustable to provide a set range of diameters. The arcuate pieces include vents therethrough to allow air circulation between the containers.

The device provides a substantially horizontal surface between the containers to support decorative materials such as bark, moss, dirt, or other decorative materials which hide the otherwise unsightly open space between the containers and provide a decorative finished look to the plants and containers.

DRAWINGS

Figure 2:
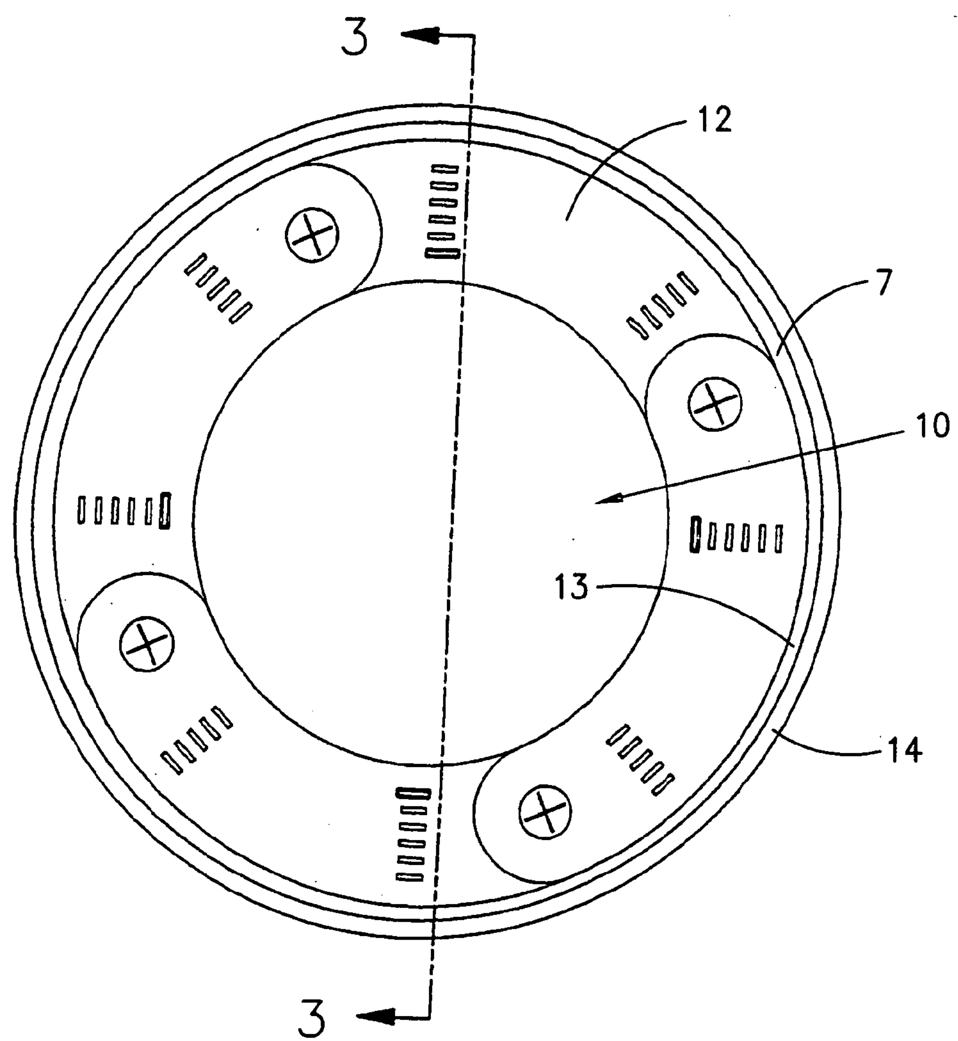
Figure 3:
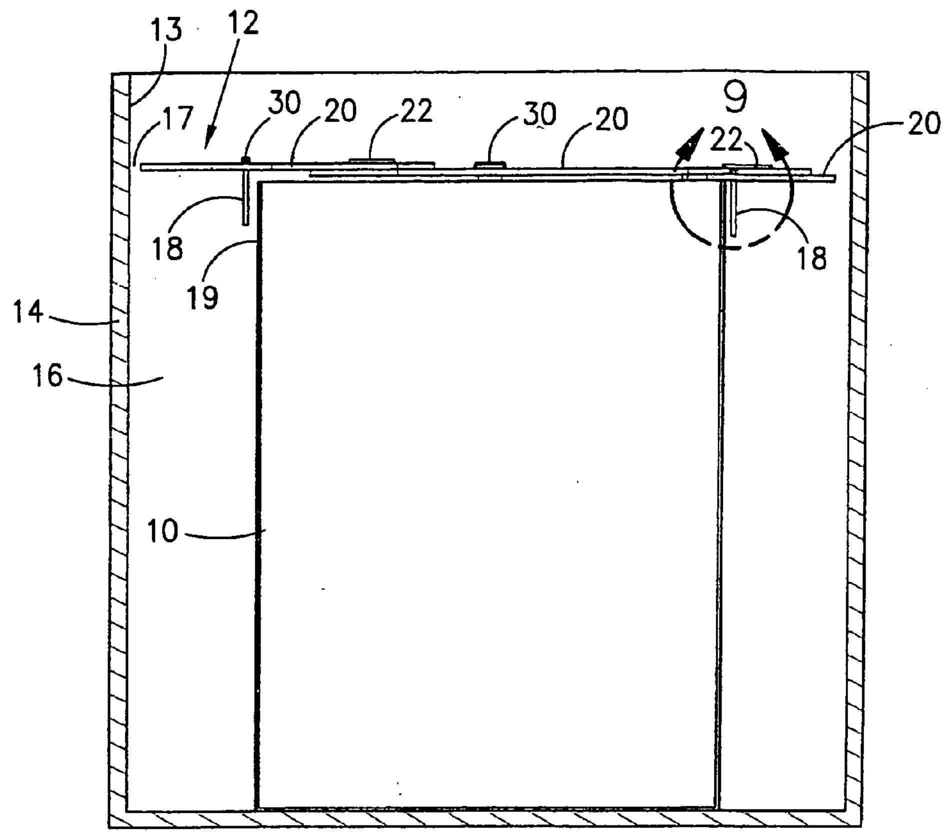
Figure 9:
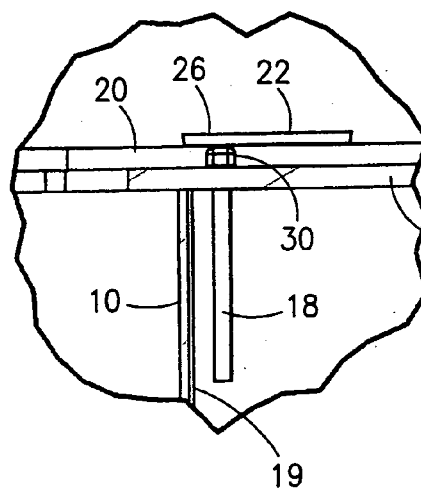
Figure 10:
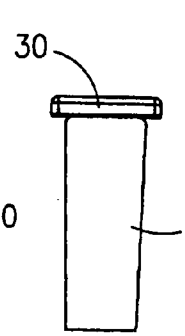
Figure 11:
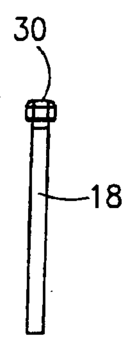
Figure 12:
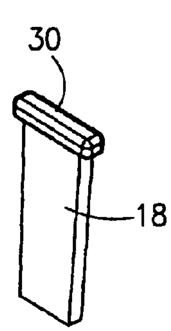
Figures 4, 5, 6:
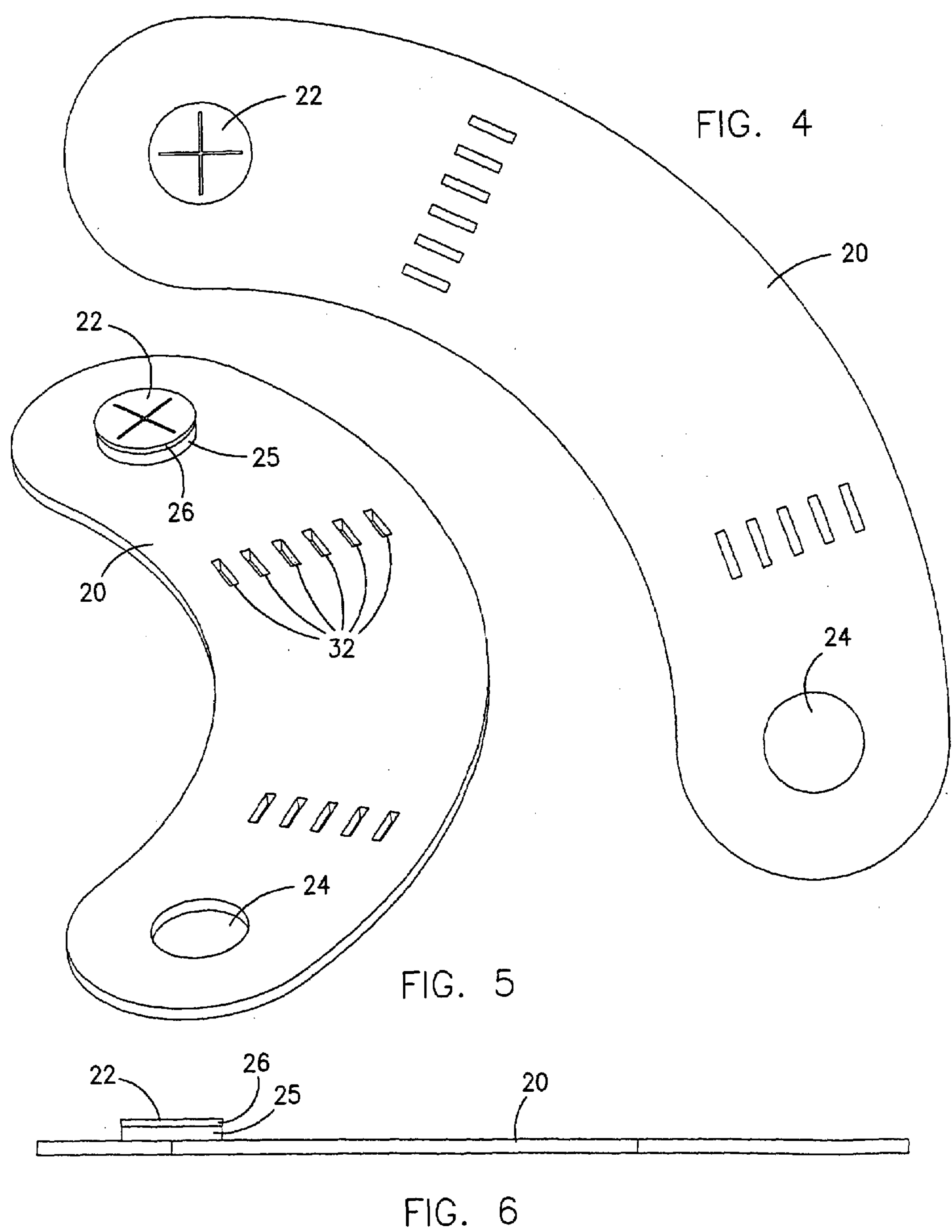
Figure 7:
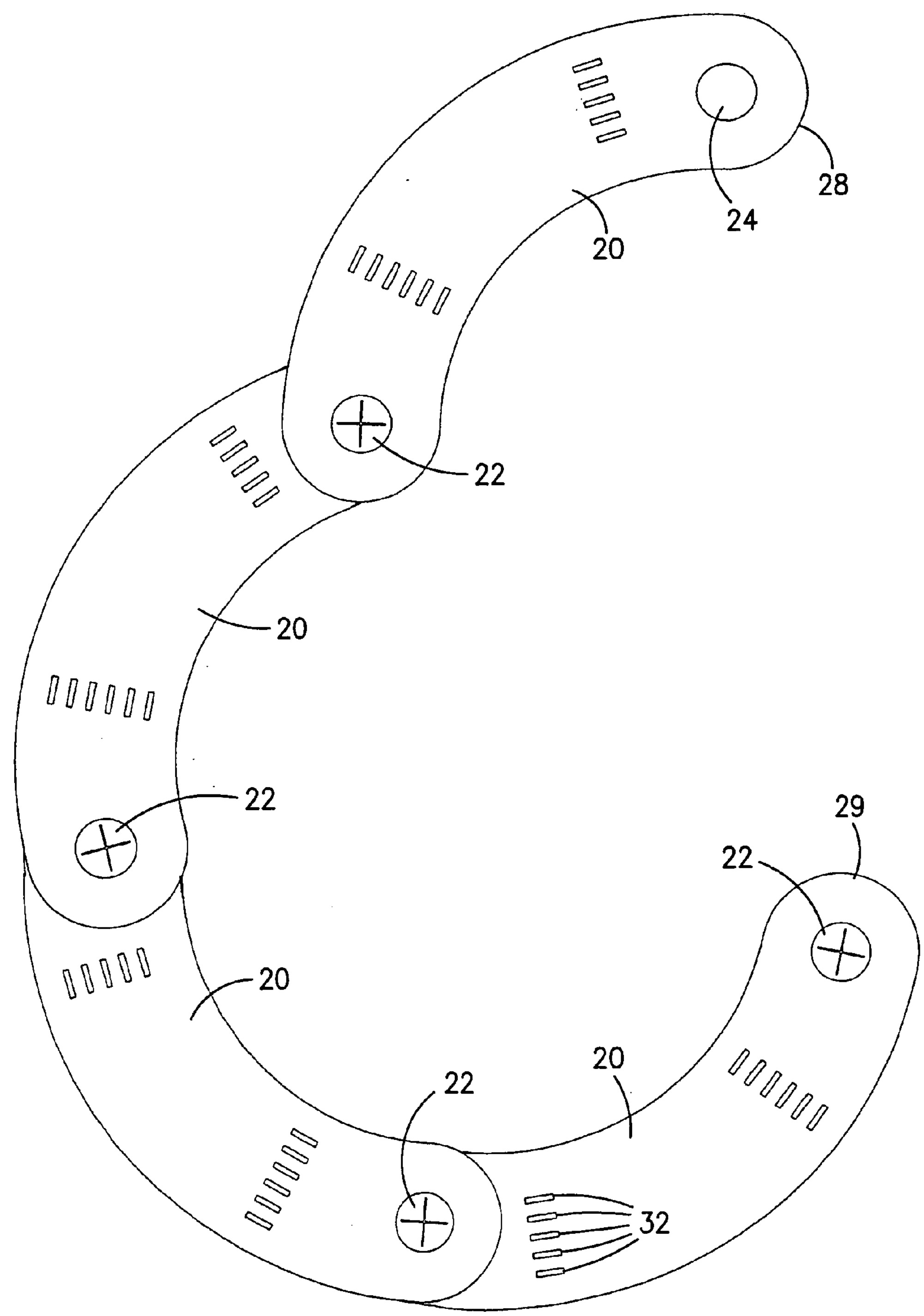
Figure 8:
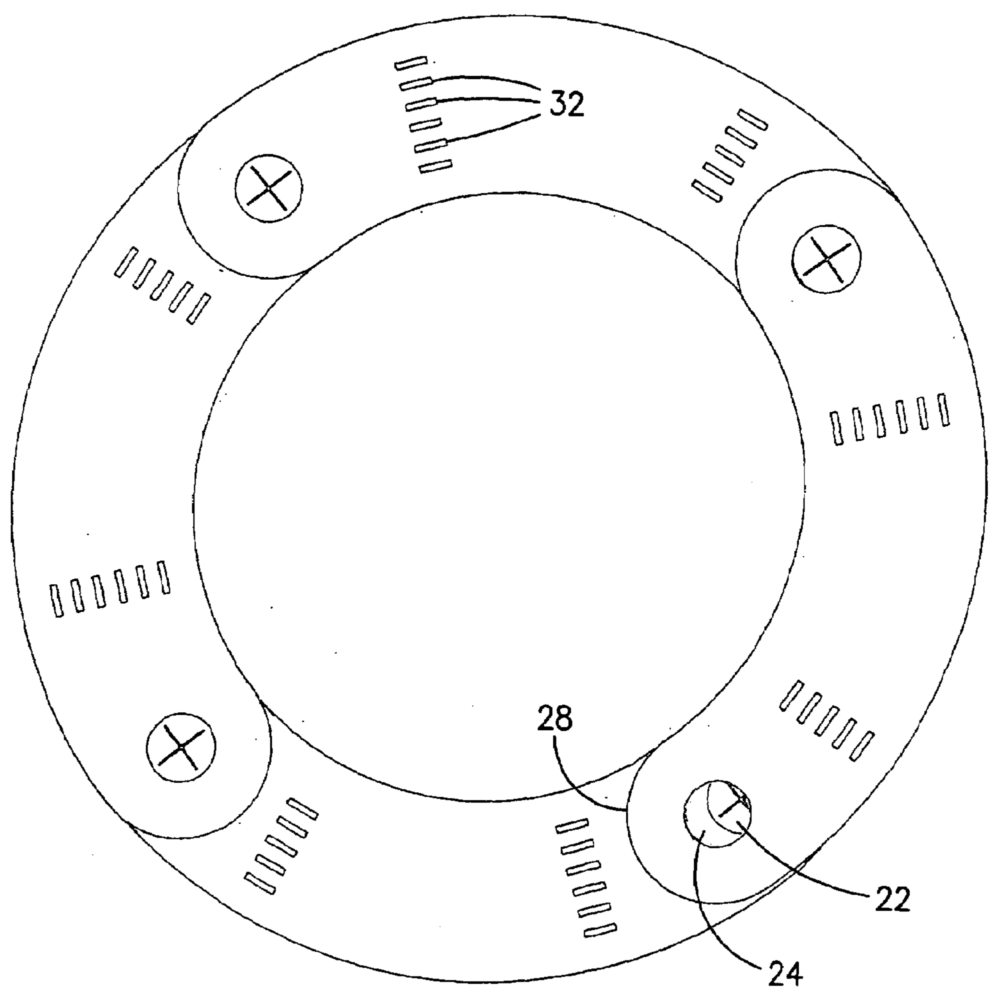
Figures 13, 14, 15:
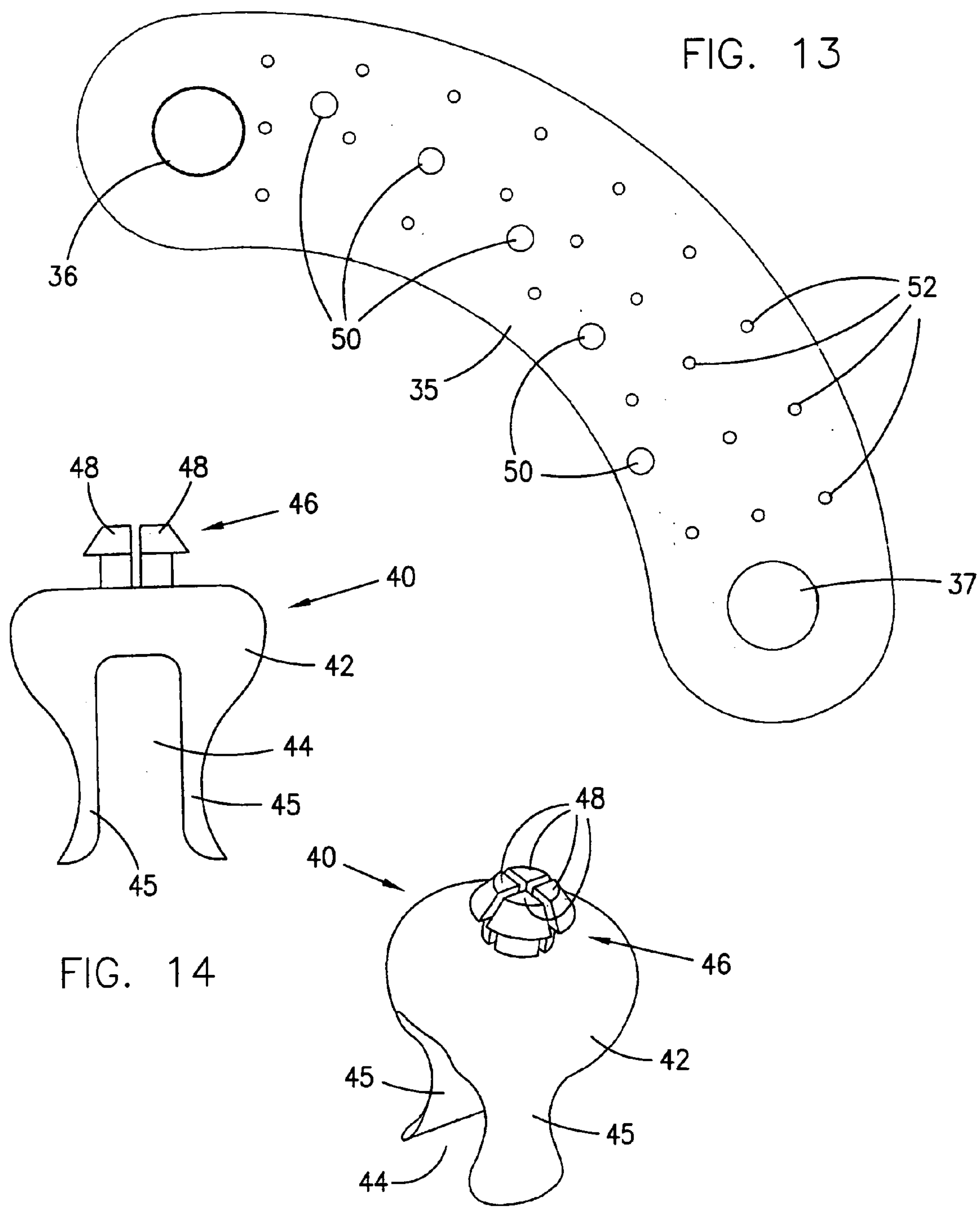

The best mode currently contemplated for carrying out the invention in actual practice is illustrated in the accompanying drawings, in which:

FIG. 1 is a perspective view of a device of the invention in place on a growing container and covering the space between the growing container and the inner wall of a decorative outer container;

FIG. 2, a top view of the device installation of FIG. 1;

FIG. 3, a vertical section taken on the line 3—3 of FIG. 2;

FIG. 4, a top plan view of an arcuate piece used in the assembly of the device of the invention;

FIG. 5, a perspective view of the arcuate piece of FIG. 4;

FIG. 6, a side view of the piece of FIGS. 4 and 5;

FIG. 7, a top view of an assembled device of the invention;

FIG. 8, a top view of an assembled device of the invention shaped for use;

FIG. 9, an enlarged view of the portion of FIG. 3 enclosed by the line 9—9;

FIG. 10, an enlarged front elevation of a tab;

FIG. 11, an enlarged side elevation of a tab;

FIG. 12, an enlarged perspective view of a tab;

FIG. 13, a top view of an alternate arcuate piece of the invention;

FIG. 14, a side elevation of a clip of the invention; and

FIG. 15, a perspective view of the clip of FIG. 14.

DETAILED DESCRIPTION OF THE INVENTION

The device of the invention is made to rest on and/or be clipped onto the top of a growing container placed inside an outer decorative container. The device may be used indoors or outdoors. The device is adjustable to fit a variety of sizes of both growing containers and outer decorative containers as well as various combinations of different sized growing containers in different sized decorative containers. The device forms a surface covering the space between the inner growing container and the outer decorative container and allows a variety of decorative top dressings to be placed in the outer container on top of the device to decoratively cover the space between the inner and outer containers. The device holds the top dressing in place over the space and prevents the top dressing from moving or falling down into the space between the containers, which could possibly harm the live plant in the growing container and which also destroys the decorative look of the plant installation. Rectangular holes in the device allow the selected placement of tabs that hold the device in place with respect to the inner growing container and double as air ventilation holes to allow air to flow in the space between the containers.

FIG. 1 is a perspective view of an inner growing container 10, with a device of the invention 12 resting on the top of the inner growing container and extending close to the inside wall 13 of outer decorative container 14. FIG. 2 is a top view of the arrangement of FIG. 1, while FIG. 3 is a vertical section taken on the line 3—3 of FIG. 2. The device of the invention extends from the top of the inner growing container 10 over the space 16, FIG. 3, between the containers. With the particular arrangement shown in FIGS. 1–3, the device of the invention 12 does not extend to contact with the inside wall 13 of the outer container, leaving a small space 17 between the outer edge of the device and the inner wall of the container. Most decorative top dressing materials will not fall through this small opening or gap. Tabs 18, FIG. 3, extend downwardly in the device to hold the device in position on the top of the inner growing container 10. Thus, tabs 18 limit horizontal movement of the device on the top of the inner container by abutting the outer wall 19 of the inner container if the device is moved to far in one direction or the other.

The invention is made up of a plurality of arcuate pieces 20, FIGS. 4–8. Each piece 20 has a molded post 22 at one end and a post receiving through hole 24 at the opposite end. The pieces 20 can be connected together by forcing the post 22 of one piece into and through the hole 24 in the piece to be joined. Posts 22 have circular vertical walls 25, FIGS. 5 and 6, extending from connection with piece 20 with an outwardly tapered upper wall 26 extending from the top of vertical wall 25 to the top of post 22. The diameter of the circular vertical wall 25 is slightly less than the diameter of receiving holes 24, with the height of vertical wall 25 being approximately equal to the thickness of piece 20. The tapered upper wall 26 tapers to a maximum diameter at the top of the post greater than the diameter of the receiving hole 24. The pieces 20 with posts 22 are molded of plastic. The tapered upper wall 26 of each post 22 is configured to resiliently deform as the post is pushed through a hole 24. The tapered upper wall 26 will spring back to its starting or original diameter as it passes through the hole 24 and exits the hole as hole 24 is positioned around vertical wall 25. Vertical wall 25, when positioned in hole 24, can freely rotate in hole 24. Tapered upper wall 26 with a diameter greater than the diameter of hole 24 keeps the joined pieces together and prevents them from separating until enough force is applied to deform tapered upper wall 26 and force it back through hole 24 to separate the pieces. Where some resistance to rotation of the joined pieces is desired, the height of vertical wall 25 can be made slightly shorter than the thickness of piece 20 so that the lower portion of tapered wall 26 will press against the upper portion of hole 24 and provide resistance to rotation of piece 20 around post 22. The dimensions can be adjusted in known manner to provide a desired amount of resistance to rotation.

For the illustrated embodiment of the device of the invention, which is made up of four arcuate pieces 20 connected in end-to-end fashion, three of the posts 22 pivotally connect the four pieces 20 together to leave two ends 28 and 29 unconnected so that the pieces may be pivotally moved with respect to one another, to be formed into an approximate ring shape. This connection between the pieces is shown in FIGS. 1–3 and 7 and 8. FIGS. 7 and 8 show the two unconnected ends 28 and 29. Unconnected end 28 has a hole 24 while unconnected end 29 has a post 22. If the inside diameter of the outer container with which the device is to be used is approximately equal to or only slightly larger than the outer diameter of the ring of the invention when all pieces are connected, as in the case shown in FIGS. 1–3, the post in end 29 can be pushed through hole 24 in end 28 to connect the unconnected ends to form a fully connected ring. However, if the inside diameter is larger or smaller than the fully connected ring, the ends 28 and 29 are left unconnected and the device is formed into an approximate ring which approximately fits the inside diameter of the outer container. By leaving two ends unconnected, the arcuate pieces 20 can be moved to form substantially circular ring shaped configurations over a range of diameters to approximately match the inner wall diameter of a variety of sizes of outer containers 14. FIG. 8 shows the device of the invention sized to fit an outer container with an inner wall diameter smaller than the diameter of a fully connected ring. Thus, as seen in FIG. 8, the unconnected ends over lap to an extent where the hole 24 in end 28 does not line up with the end post 22, only a portion of end post 22 being visible through end hole 24. With the unconnected ends, a range of outer pot inside wall diameters can be accommodated by the invention.

While the device can be adjusted to work with a range of outer pot inside wall diameters, the range of adjustability to maintain approximately circular circumferences of the device is limited. Therefore, it is preferred that the device be supplied in various sizes to fit a wide variety of container sizes. Thus, for example, the device can be manufactured in small, medium, and large sizes with the small device fitting in outer containers having between ten and twelve inch inner diameters and fitting over the rim of inner containers of six to eight inch outer diameter, the medium device fitting in outer containers having between fourteen to sixteen inch inner diameters and fitting over the rim of inner containers of eight to twelve inch outer diameters, and the large device fitting in outer containers having between sixteen to twenty inch inner diameters and fitting over the rim of inner containers of ten to fourteen inch outer diameters. These sizes are only examples of sizes that can be made, but with the three sizes indicated, most decorative planters currently in use can be accommodated with one of the devices.

While the device of the invention, when sized to the inner wall diameter of the outer decorative container, can merely be placed on top of the inner growing container and used in that manner, it is currently preferred to provide stops to help maintain the positioning and sizing of the device when placed on the inner container. For this purpose, tabs 18, FIGS. 3 and 9–12, with tab tops 30, are passed through and positioned in selected slots 32 of a plurality of slots 32, FIGS. 1, 2, and 4–8, in pieces 20. A user of the device will determine the approximate outer diameter of the inner growing container and will determine which set of slots 32 most closely surround the outside of the inner container. The tabs 18 are then inserted through the selected slots 32, as shown in FIGS. 3 and 9, to extend downwardly from pieces 20 just beyond the outside wall 19 of the inner growing container 10. The tabs 18 are inserted into slots 32 from the top of the pieces 20 and are pushed through the slots 32 until tab top 30 is pressed against the top surface of piece 20. Tabs 18 may be slightly tapered so each tab will fit tightly into a slot 32 at its upper portion adjacent tab top 30 when the tab is pushed all of the way into the slot. A tab can be removed by pulling up on a tab top 30, or by pushing up on the bottom of a tab 18. Since tab slots 30 are arranged in an outwardly extending radial pattern, the slots provide a range of adjustment to fit relatively closely to, but outside of, the outer wall of a range of inner container outside wall diameters. FIGS. 3 and 9 show tabs 18 in close proximity to the outer wall 19 of the inner container 10. It is preferred that at least one tab be installed in each of the pieces 20. Tab slots are provided so that two tabs can be provided for each piece 20. With the tabs 18 installed in the device, and the device sized to fit over an inside growing container and to fit within the inner walls of the outer container, tabs 18 will keep the device in its approximate adjusted size and position. For example, if a piece 20 is pushed to rotate it inwardly toward the center of the containers, tab 18 will hit inner container outer wall 19 to prevent the rotation. The tabs will also keep the device approximately centered on the inner container.

While the device has been shown with four pieces 20 connected end-to-end with each piece making up about one quarter of the device, any number of pieces could be used. Further, rivets or other connecting means could be used to pivotally connect the pieces together.

In use, the device is adjusted to fit over the top rim of the inner container and to fit substantially against the inner side of the outer container or adjacent the inner side of the outer container to cover the space between the inner and outer containers and provide a substantially flat surface upon which decorative material can be placed. It is not, however, necessary that the outer circumference of the device fit exactly against the inside of the outer container as generally the decorative material will be adequately supported by the upper surface of the device if it covers most of the space between the containers and the decorative material will cover any gaps that are present.

An alternate system to keep the device of the invention in position on inner container 10 is shown in FIGS. 13–15. This alternate embodiment uses the same shape and size arcuate pieces, shown as 35 in FIG. 13, as the embodiment using the tabs, but has a different arrangement of holes through the arcuate pieces. The arcuate pieces still each have a post 36 at one end and a post receiving hole 37 at the opposite end. In this alternate embodiment, clips 40, FIGS. 14 and 15, are secured to arcuate pieces 35 to attach the device to the top of the inner growing container 10. Clips 40 include a container attachment portion 42, with slot 44 to fit over the top rim of the inner container 10. The slot 44 can be sized to loosely receive the top rim of a container therein or to tightly receive the top rim of the container. With variations in rim size, some rims may fit loosely while other rims may fit tightly. Clips 40 will usually be molded of resilient material so the walls 45 forming slot 44 will bend outwardly to receive larger container rims. A securement portion 46 of the clip 40 includes tabs 48 that snap into a receiving hole 50, FIG. 13, in piece 35. A series of receiving holes 50 are provided in piece 35 at different distances from inside to outside edges so that clips 40 can be located to fit a variety of diameters of inner containers 10. Holes 52 in pieces 35 allow air flow through the pieces and into the space between the containers.

While the device could be made of various materials, it is currently preferred that all pieces be made of a relatively rigid, but flexible plastic material that will hold its shape and maintain a relatively solid shelf extending over the space between the inner and outer containers to support the topping material. In molding the pieces, the thickness of the pieces is adjusted to provide the relatively rigid arcuate pieces and the resilient tapered upper post wall portions.

Whereas this invention is here described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

The invention claimed is:

1. A device for covering space between an inner plant growing container having a top container rim and an outer decorative container having an inside wall and providing a surface upon which decorative material can be placed, comprising:

- a plurality of arcuate pieces pivotally joined end to end by a single pivot connection at each end and the joined plurality of arcuate pieces having opposite unconnected ends, each arcuate piece having opposite ends and having a post integrally formed into and extending from the piece at one end and having a post receiving hole at the opposite end, the pieces being pivotally joined by inserting the post of one piece into the post receiving hole of another piece, the pieces being joined in a manner allowing the pieces to be adjustably moved into ring configurations of different diameters to approximately fit within the inner wall of the outer container and rest on the top rim of the inner container;
- a plurality of positioning pieces extending from the arcuate pieces and positioned in relation to the outer wall of the inner container when installed over the inner container to stabilize the device on the inner container; and a plurality of positioning piece receiving holes positioned at a plurality of different locations and arranged in an outwardly extending radial pattern in each arcuate piece to receive a positioning piece and allow the positioning piece to be placed in a selected location in the arcuate piece by selecting the receiving hole through which the positioning piece is passed to thereby position and stabilize the device with respect to inner containers of different diameters.

2. A device for covering space between an inner plant growing container and an outer decorative container according to claim 1, wherein the post includes a resilient top portion of diameter greater than the post receiving hole which deforms to pass through the post receiving hole and returns to its original dimension after passing through the post receiving hole to hold the post in the post receiving hole.

3. A device for covering space between an inner plant growing container and an outer decorative container according to claim 1, additionally including vent holes through the device.

4. A device for covering space between an inner plant growing container and an outer decorative container according to claim 1, wherein the positioning pieces are tabs positioned in close proximity to the outer wall of the inner container when the device is installed over the inner container and the receiving holes are slots extending through the arcuate pieces to receive the tabs.

5. A device for covering space between an inner plant growing container and an outer decorative container according to claim 4, wherein the tab includes an enlarged tab top to position the tab in the tab receiving slots.

6. A device for covering space between an inner plant growing container and an outer decorative container according to claim 1, wherein the positioning pieces are clips for attachment to the inner container when the device is installed over the inner container.

7. A device for covering space between an inner plant growing container and an outer decorative container according to claim 6, wherein the clips include a slot for receiving a top rim of the inner container.

8. A device for covering space between an inner plant growing container having a top container rim and an outer decorative container having an inside wall and providing a surface upon which decorative material can be placed, comprising:

a plurality of arcuate pieces pivotally joined end to end and the joined plurality of arcuate pieces having opposite unconnected ends, the pieces being joined in a manner allowing the pieces to be adjustably moved into ring configurations of different diameters to approximately fit within the inner wall of the outer container and rest on the top rim of the inner container;

a plurality of positioning pieces extending from the arcuate pieces and positioned in relation to the outer wall of the inner container when installed over the inner container to stabilize the device on the inner container; and a plurality of positioning piece receiving holes positioned at a plurality of different locations and arranged in an outwardly extending radial pattern in each arcuate piece to receive a positioning piece and allow the positioning piece to be placed in a selected location in the arcuate piece by selecting the receiving hole through which the positioning piece is passed to thereby position and stabilize the device with respect to inner containers of different diameters.

9. A device for covering space between an inner plant growing container and an outer decorative container according to claim 8, wherein the positioning pieces are tabs positioned in close proximity to the outer wall of the inner container when the device is installed over the inner container and the receiving holes are slots extending through the arcuate pieces to receive the tabs.

10. A device for covering space between an inner plant growing container and an outer decorative container according to claim 9, wherein the tab includes an enlarged tab top to position the tab in the tab receiving slots.

11. A device for covering space between an inner plant growing container and an outer decorative container according to claim 8, wherein the positioning pieces are clips for attachment to the inner container when the device is installed over the inner container.

12. A device for covering space between an inner plant growing container and an outer decorative container according to claim 11, wherein the clips include a slot for receiving a top rim of the inner container.

13. A device for covering space between an inner plant growing container and an outer decorative container according to claim 8, additionally including vent holes through the device.

* * * * *